United States Patent [19]

Schicketanz

[11] 4,021,121

[45] May 3, 1977

[54] METHOD AND APPARATUS FOR MEASURING THE DISTANCE OF A DISCONTINUITY OF A GLASS FIBER FROM ONE END OF THE FIBER

[75] Inventor: Dieter Schicketanz, Munich, Germany

[73] Assignee: Siemens Aktiengesellschaft, Berlin & Munich, Germany

[22] Filed: Oct. 29, 1975

[21] Appl. No.: 626,826

[30] Foreign Application Priority Data

Oct. 30, 1974 Germany .......................... 2451654

[52] U.S. Cl. .............................. 356/237; 356/239
[51] Int. Cl.² ................. G01N 21/16; G01N 21/32
[58] Field of Search .................. 356/4, 5, 237, 239, 356/237; 250/227, 562, 572

[56] References Cited

UNITED STATES PATENTS

| 3,402,630 | 9/1968 | Blau et al. ............................ 356/5 |
| 3,728,026 | 4/1973 | Idestrom et al. ...................... 356/5 |
| 3,743,419 | 7/1973 | Shagerlund ........................... 356/5 |
| 3,884,585 | 5/1975 | Lebduska ........................... 356/239 |

OTHER PUBLICATIONS

"Pinpointing Cable Faults," Allan; Post Office Telecommun J. (GB), vol. 22, No. 4, 1970–1971, pp. 5–7.

*Primary Examiner*—Vincent P. McGraw
*Attorney, Agent, or Firm*—Hill, Gross, Simpson, Van Santen, Steadman, Chiara & Simpson

[57] ABSTRACT

A method and apparatus for measuring the distance of a discontinuity in a glass fiber from one end of the fiber characterized by coupling a pulse into the one end, sensing a pulse of light reflected by a discontinuity as it leaves the one end and measuring the time lapse between the pulse to determine the distance of the discontinuity from the one end.

5 Claims, 3 Drawing Figures

METHOD AND APPARATUS FOR MEASURING THE DISTANCE OF A DISCONTINUITY OF A GLASS FIBER FROM ONE END OF THE FIBER

BACKGROUND OF THE INVENTION

The present invention relates to a method and apparatus for the measurement of a distance of a discontinuity of a glass fiber from one end of the fiber.

In optical structures with glass fibers, it has been long desired to be able to measure the reflections from plugs, immersion fluids, adhesives, photodiodes and other discontinuities which may be associated with the fiber. In particular, it is desirable to be able to measure the distance of these discontinuities from one end when only the one end of the glass fiber is accessible.

SUMMARY OF THE INVENTION

The present invention is directed to a method and apparatus which enables measuring the distance of a discontinuity of a glass fiber from one end of the fiber. To accomplish this task, the method and apparatus includes coupling a light pulse into the one end of the glass fiber, sensing a reflected light pulse from a discontinuity in the glass fiber as the reflected pulse leaves the one end, and measuring the time interval between coupling of the light pulse into the one end of the fiber and sensing the reflecting light pulse to determine the distance of the discontinuity from the one end. The apparatus preferably utilizes a pulse laser for producing the light pulse, coupling means which includes a beam divider which may include optical means such as lenses for focusing the pulse into the one end and which coupling means will direct the reflected pulse received from one end to a means for sensing the light pulse. The measuring is accomplished by means for measuring which includes a counter which receives a triggering pulse to start the counter and which counter is stopped by a pulse from the light sensing means when the sensing means senses a reflected pulse. The laser is preferably a pulse laser which includes control means utilizing a pulse generator which may provide the triggering pulse to start the counter.

DESCRIPTION OF THE PREFERRED EMBODIMENT

Figure 1:
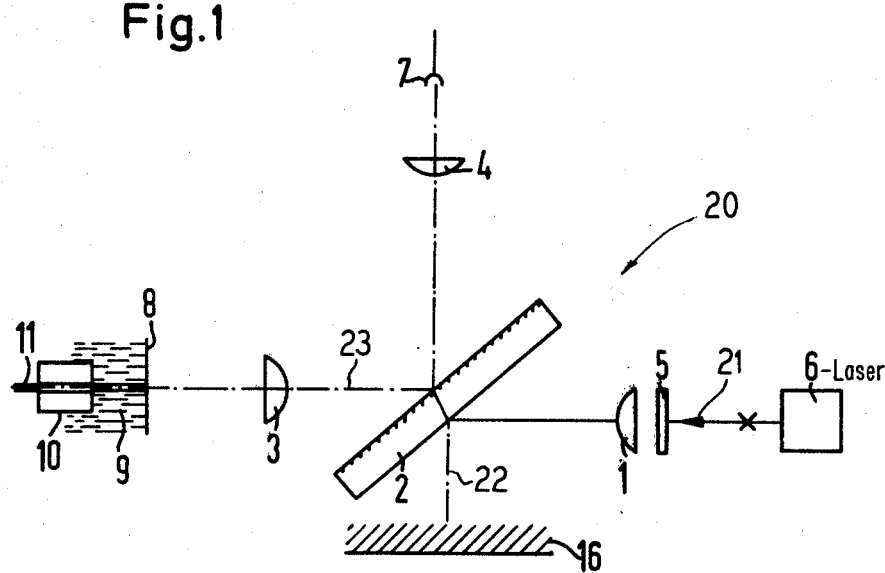
FIG. 1 is a schematic illustration of an apparatus for forming the method of the present invention.

The principles of the present invention are particularly useful when utilized in a device generally illustrated at 20 in FIG. 1.

The device 20 includes a pulse laser 6 which is a laser diode and transmits a light pulse 21 through a first focusing means such as a lens 1 to strike a beam divider 2 which is for example a 50% mirror. The pulse 21 from the laser is divided in two portions 22,23 by the beam divider 2 with the unused portion 22 being fed or directed to a light absorbing surface 16 so that no disruptive reflections come about. If desired, the unused portion 22 may be directed to a light sensing means 15 (FIG. 2) to create a reference signal.

The other portion 23 is directed towards an end of an optical fiber 11 and is preferably focused at the end by a second focusing means comprising a lens 3. In order to avoid reflections as the pulse 23 strikes the end of the fiber 11, a coated quartz plate 8 is disposed adjacent the end of the fiber 11 and the gap between the plate 8 is filled with an immersion fluid 9. As illustrated, the fiber 11 is releasably held in a prism-shaped guideway 10 so that the fiber being measured may be easily interchanged.

The pulse as it travels through the glass fiber 11 will be reflected when it reaches the opposite end or strikes a discontinuity in the fiber. When reflected, it will return and exit through the one end and strike the beam divider 2 which will reflect it preferably through focusing means such as a lens 4 onto a light sensing means receiver 7 which is a light sensitive receiver.

Since short fibers will require pulses having less magnitude than the longer fibers, it is desirable that the output of the laser 6 can be changed as the length of the fibers being tested is changed. However, it is undesirable to decrease the output of the laser by decreasing the current applied thereto because the necessary decreases in the current may fall in the vicinity of the laser threshold and cause alteration in the shape of the pulse as well as cause a timewise shifting. Thus, the apparatus includes one or more interchangeable dampening filters 5 which are disposed in the path of the output pulse 21 of the laser to vary the output power of the pulse.

It is especially favorable if all the optical surfaces for a utilized wavelength of the pulse laser 6 are coated to minimize reflection losses. It is also desirable for the laser 6, the guideway 10 as well as the receiver 7 to be adjustable in three dimensions relative to the coupling device 2.

Figure 2:
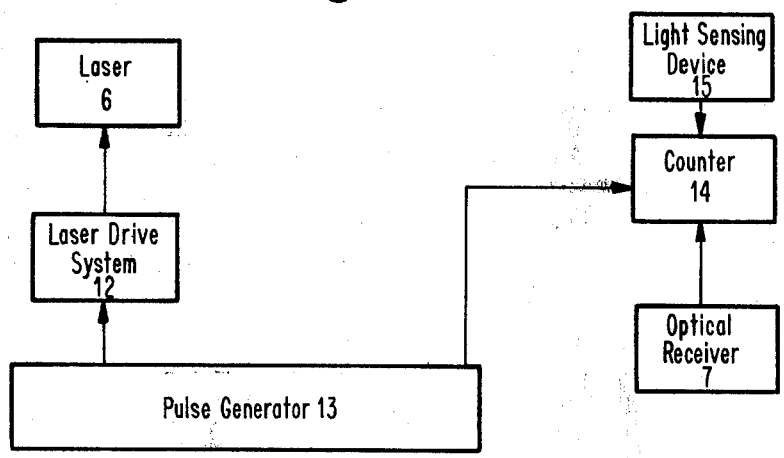
FIG. 2 is a block circuit diagram of the apparatus for forming the present invention.

In FIG. 2, a block circuit diagram of the inventive device is illustrated. The block 6 is the pulse laser which preferably is a laser diode of the type LD22 which is sold by Laser Diode Company and which produces light of a wavelength of 905 m (9050 angstroms). If a wavelength of 850 nm (8500 angstroms) is desired, a laser diode LA63 which is sold by the above manufacturer can be utilized. The laser 6 is triggered by a laser drive or control system 12 which can contain either a thyristor, a transistor or an avalanche transistor as an amplification element. The laser drive system 12 is controlled by a control device having a pulse generator 13 which produces pulses of a pulse width of 1 microsecond and at a pulse repetition frequency of 1 kHz and at an amplitude of approximately 5 volts. An example of a suitable pulse generator is a pulse generator 101 which is manufactured and sold by the Data Pulse Company.

As mentioned above, light pulses which are reflected by a discontinuity or by a fiber end are directed to the light sensing means such as an optical receiver 7 which generates an electrical pulse from the sensed reflected light pulse. An example of suitable optical receivers are of a type such as RCA's type C 30815 or Texas Instrument type TIXL74. Electrical pulses from the receiver 7 are fed to a stop input on a counter 14 which receives a triggering or starting pulse from the pulse generator 13. An example of a typical counter which may be utilized is for example a Tektronix type DC 505 or a Hewlett Packard type 5245 L.

Figure 3:
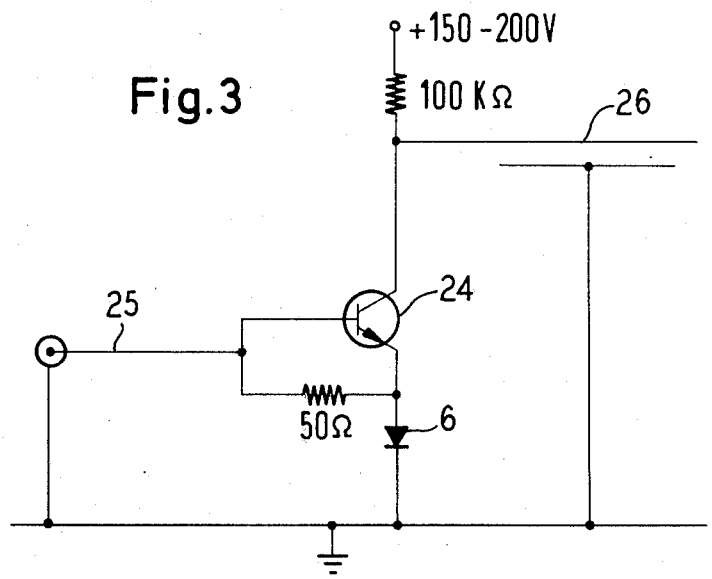
FIG. 3 is a block circuit diagram of the laser control or drive unit utilized in the present invention.

As mentioned above, the drive 12 may contain either a thyristor, transistor or an avalanche transistor as an amplifying element. As illustrated in FIG. 3, the pulse laser 6 is connected to a power supply by an avalanche transistor 24 which receives an input pulse via line 25 from the pulse generator 13. A strip line 26 is connected across the avalanche transistor 23 and may be for example approximately 1Ω≈5ns of electrical length and may comprise a Teflon foil of 3 × 15 cm which foil is coated with copper.

As mentioned above, the pulse which is coupled into one end of the glass fiber will be reflected by either the opposite end or a discontinuity contained in the fiber. Thus, the term "discontinuity" should be interpreted in the present invention as including th discontinuity that occurs at the opposite end of the glass fiber.

Since the speed of propagation of the light in the glass fiber is easily determined and known, the geometric distance of the discontinuity from the one end of the glass fiber can be easily calculated from the measured time interval between coupling of the pulse into the one end and receiving or sensing the reflected pulse.

Due to the multiplicity of the losses which occur only a high output pulse laser and sensitive receivers can be utilized in the above apparatus. Since the reflected output at the fiber end which is in contact with the area amounts to a so-called Fresnel reflection in quartz of 3.5%, the return signal is weaker by 15 dB. Based on this assumption, the following measurements of reflection were made with the other end of the glass fiber in contact with different materials.

| Fiber end in contact with: | Reflection Factors |
|---|---|
| air (calibration value) | 0.035 |
| Aluminum mirror | 0.77 |
| mercury drops | 0.35 |
| glycerin drops | 0.0015 |
| non-coated photodiode (BPX 65) | 0.23 |
| non-coated photodiode immersed | 0.11 |
| coated diode (BPX special) | |
| outside the coating | 0.23 |
| inside the coating | 0.038 |
| immersed and inside the coating | not measured |
| plug, not immersed | 0.052 |
| plug, immersed | 0.0035 |
| water ($n_{20}^D = 1.333$) | 0.0039 |
| glycerin + water ($n_{20}^D = 1.46$) | 0.00035 |
| bromonaphthaline ($n_{20}^D = 1.66$) | 0.0049 |
| methylene iodine ($n_{20}^D = 1.74$) | 0.011 |

If a simple GaAs heterostructure laser diode with a pulse width of 100 ns and a 1 watt coupled-in output is used, a 95 dB of dampening can still be permitted. A disadvantage of the broad pulses (100 ns) consists in the fact that the resolution between two neighboring reflections comes at approximately 10 meters. Thus, the point of reflection can be determined with only an accuracy of ± 3.5 meters. However, if one works with a repetition frequency of a few kHz for the pulse laser, then one can employ a regulated amplifier and the accuracy improves to 1 meter. This relatively high accuracy comes from the fact that the pulse must pass through the glass fiber twice and the speed of light in glass is substantially less than that of air. Thus, a doped quartz glass fiber for a light pulse of a wavelength of 0.9 um has an index of refraction of 1.46 and the speed of the light pulse in the glass fiber is 0.1026 m/ns.

While the apparatus of FIG. 2 suggests starting the counter 14 with a triggering pulse from the pulse generator 13 which pulse is applied to the laser drive 12, it is possible to use a second light sensing device 15 similar to the receiver 7. This second light receiver is positioned to receive the portion 22 and will create a starting signal or pulse which is applied to the counter.

Although various minor modifications may be suggested by those versed in the art, it should be understood that I wish to employ within the scope of the patent granted hereon, all such modifications as reasonably and properly come within the scope of my contribution to the art.

I claim:

1. An apparatus for measuring the interval of a discontinuity in a glass fiber from one end of the glass fiber comprising means for releasably holding a glass fiber in a guideway, a coated quartz plate being disposed in front of one end of the glass fiber to provide a gap therebetween, an immersion fluid filling said gap, a laser for producing light pulses directed at said one end of the glass fiber, means for sensing a light pulse, means for coupling the light pulse from the pulse laser through the quartz plate and immersion fluid into said one end of the fiber, said means for coupling directing a reflected pulse into said means for sensing, and means for measuring the time delay between the coupling of a light pulse from the laser into said one end of the fiber and the sensing of the reflected light pulse so that the distance of the discontinuity from said one end can be determined.

2. An apparatus according to claim 1, wherein said laser includes a control means including a pulse generator, wherein said means for measuring the time delay includes a counter triggered by a pulse from the pulse generator and stopped by a pulse produced by the means for sensing a light pulse.

3. An apparatus according to claim 1, wherein the coupling device comprises a beam divider.

4. An apparatus according to claim 3, wherein the coupling device further includes optic means for focusing the pulse from the laser.

5. An apparatus according to claim 3, wherein the laser includes a control means for controlling the operation of the pulse laser, said control means includes a pulse generator, wherein said means for measuring includes a counter receiving a starting signal from said pulse generator and a stopping signal produced by the means for sensing a light pulse upon receiving a reflected light pulse.

* * * * *